United States Patent [19]

Okazaki et al.

[11] Patent Number: 5,668,225
[45] Date of Patent: Sep. 16, 1997

[54] WATERPROOF SEEALER FOR CONNECTORS

[75] Inventors: Kiyotaka Okazaki; Sinichi Kogure; Masahiro Kanda; Shiroh Kobayashi, all of Shizuoka, Japan

[73] Assignee: Yazaki Corporation, Tokyo, Japan

[21] Appl. No.: 774,635

[22] Filed: Dec. 30, 1996

Related U.S. Application Data

[63] Continuation of Ser. No. 333,985, Nov. 2, 1994, abandoned.

[30] Foreign Application Priority Data

Nov. 4, 1993 [JP] Japan .................................. 5-275266

[51] Int. Cl.$^6$ ................................................ C08G 77/08
[52] U.S. Cl. .......................... 525/478; 523/211; 524/268; 524/588; 524/731; 524/862; 528/15
[58] Field of Search .......................... 523/211; 525/478; 524/268, 588, 731, 862; 528/15

[56] References Cited

U.S. PATENT DOCUMENTS

| | | | |
|---|---|---|---|
| 4,481,341 | 11/1984 | Schlak et al. | 525/478 |
| 4,742,101 | 5/1988 | Yoshida | 524/267 |
| 4,766,176 | 8/1988 | Lee et al. | 525/100 |
| 5,015,691 | 5/1991 | Lewis et al. | 525/100 |
| 5,153,238 | 10/1992 | Bilgrien et al. | 523/211 |
| 5,232,959 | 8/1993 | Togashi et al. | 523/211 |

*Primary Examiner*—Margaret W. Glass
*Attorney, Agent, or Firm*—Sughrue, Mion, Zinn, Macpeak and Seas

[57] ABSTRACT

An oil-bleeding waterproof sealer for a connector comprising a vulcanized and molded article of a composition comprising: (A) 100 parts by weight of a diorganopolysiloxane green rubber containing at least two alkenyl groups bonded to silicon atoms per molecule thereof, (B) from 10 to 100 parts by weight of a reinforcing filler, (C) from 0.1 to 10 parts by weight of an organohydrogenopolysiloxane having at least two hydrogen atoms bonded to silicon atoms per molecule thereof, (D) from 1 to 30 parts by weight of a phenyl-containing diorganopolysiloxane having a viscosity of 1 to 3,000 cSt at 25° C., and (E) a catalytic amount of a catalyst for hydrosilylation having a particle size of 0.01 to 20 μm, which comprises a platinum catalyst and a non-silicone series thermoplastic resin having a glass transition point of 50° to 200° C., with the proportion of metallic platinum in the catalyst for hydrosilylation being 0.01 to 5% by weight.

8 Claims, 2 Drawing Sheets

WATERPROOF SEEALER FOR CONNECTORS

This is a continuation of application Ser. No. 08/333,985 file Nov. 2, 1994, now abandoned.

FIELD OF THE INVENTION

This invention relates to a waterproof sealer for connectors and more particularly a waterproof sealer which can easily be fitted over connector housings, requires a reduced force for fitting connector housings to each other, and maintains satisfactory waterproofness, and which can be produced with high productivity.

BACKGROUND OF THE INVENTION

Connectors used for connecting electric circuits in automobiles are required to have high waterproofness as well as oil resistance. Therefore, many sealing rubber parts used for the connectors, such as packing and rubber stoppers, are made of oil-bleeding rubber materials. Examples of oil-bleeding rubber sealing compounds include oil-bleeding acrylonitrile-butadiene rubber (NBR) containing an aliphatic hydrocarbon oil (JP-A-61-21177, the term "JP-A" as used herein means an "unexamined published Japanese patent application"), oil-bleeding silicone rubber containing silicone oil (JP-A-62-252457), and oil-bleeding polyolefin rubber containing an ester type plasticizer (JP-A-63-309542).

However, the conventional oil-bleeding rubber materials have their several disadvantages. That is, the NBR-based material, though inexpensive and oil-resistant, has insufficient heat resistance for application in a high temperature part of an engine room. The silicone rubber-based material is excellent in heat resistance, cold resistance and oil resistance, but is expensive resulting in limited applicability. The polyolefin-based material has insufficient oil resistance for use in an engine room.

It is impossible to reduce the cost of silicone rubber itself while retaining its excellent characteristics. Hence, various studies have been directed to reduction of molding time for rubber parts to thereby reducing the unit price of the product. Millable silicone rubber generally uses an organic peroxide as a vulcanizing agent. While silicone rubber compounds of this type have satisfactory storage stability, a long pot life, and ease in handling, they need a long vulcanizing time, failing to reduce the processing time.

On the other hand, a two-part type liquid silicone rubber compound which undergoes vulcanization on addition reaction in the presence of a platinum catalyst has recently been developed and extending its use broadly. Vulcanizable in a markedly reduced time, the addition reactive liquid silicone rubber compound is effective for reduction of molding time. However, by the nature of two-part liquid system, a mixture of the two parts must be injected into a mold immediately after mixing, making the handling complicated and requires new molding equipment.

In order to solve these problems, it has been proposed to use, as a vulcanizing agent for addition reactive millable silicone rubber compounds, fine particles comprising a platinum catalyst and a phenyl-containing silicone resin. Nevertheless, the silicone resin fine particles are easily soluble in a phenyl-containing diorganopolysiloxane having a low degree of polymerization so that they fail to manifest their merits when added to an oil-bleeding rubber material containing a phenyl-containing diorganopolysiloxane having a low degree of polymerization.

SUMMARY OF THE INVENTION

An object of the present invention is to provide a waterproof sealer for a connector, which is prepared from a rubber compound free from disadvantages associated with conventional silicone resin-based oil-bleeding rubber compounds. That is, the object is to provide a waterproof sealer for a connector which can be produced by molding in a reduced time and thereby at a reduced cost, retains the excellent properties of silicone resin, i.e., heat resistance, cold resistance, and oil resistance (resistance to an engine oil or a transmission oil) and can therefore be used with safety in a high to low temperature environment.

Other objects and effects of the present invention will be apparent from the following description.

The present invention relates to an oil-bleeding waterproof sealer for a connector comprising a vulcanized and molded article of a composition comprising:

(A) 100 parts by weight of a diorganopolysiloxane green rubber containing at least two alkenyl groups bonded to silicon atoms per molecule thereof, (B) from 10 to 100 parts by weight of a reinforcing filler, (C) from 0.1 to 10 parts by weight of an organohydrogenopolysiloxane having at least two hydrogen atoms bonded to silicon atoms per molecule thereof, (D) from 1 to 30 parts by weight of a phenyl-containing diorganopolysiloxane having a viscosity of 1 to 3,000 cSt at 25° C., and (E) a catalytic amount of a catalyst for hydrosilylation having a particle size of 0.01 to 20 μm, which comprises a platinum catalyst and a non-silicone series thermoplastic resin having a glass transition point of 50° to 200° C., with the proportion of metallic platinum in the catalyst for hydrosilylation being 0.01 to 5% by weight.

DETAILED DESCRIPTION OF THE INVENTION

Figure 1:
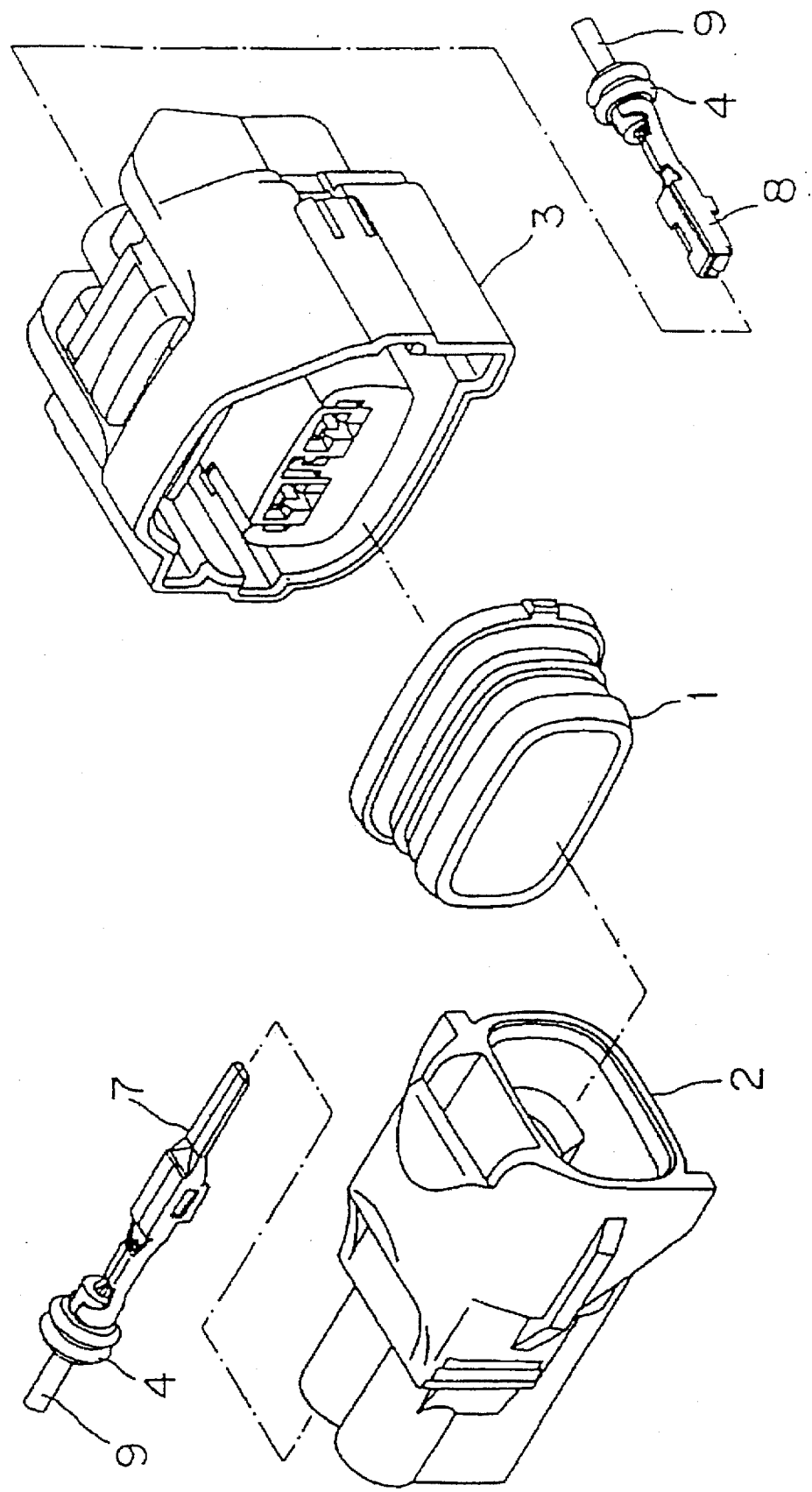
FIG. 1 is an illustration showing the manner of use of a waterproof sealer for a connector.

The diorganopolysiloxane green rubber as component (A) which can be used as a base rubber material should contain at least two Si-bound alkenyl groups per molecule thereof. Examples of the alkenyl group in component (A) includes a vinyl group, an allyl group, and a hexenyl group. Examples of other organic groups bonded to silicon atoms in component (A) include monovalent hydrocarbon groups, such as an alkyl group, e.g., a methyl group, an ethyl group, a propyl group, and a butyl group, and a substituted hydrocarbon group, e.g., a 3,3,3-trifluoropropyl group. The siloxane skeleton of component (A) may be linear or branched. The degree of polymerization of component (A) is preferably such that it has a viscosity of not lower than $10^7$ cSt at 25° C. and an average molecular weight of not less than $25 \times 10^4$, still preferably not less than $40 \times 10^4$.

The reinforcing filler as component (B) may be selected from those conventionally employed for silicone rubber compounds. Typical examples thereof include fine silica powder. Fumed silica and precipitated silica are preferred. In particular, ultrafine silica having a particle size of not greater than 50 mμ and a specific surface area of not less than 100 m²/g is still preferred. Surface-treated fine silica, for example, organosilane- or organosilazane-treated fine silica is especially preferred.

Component (B) is used in an amount of from 10 to 100 parts by weight per 100 parts by weight of component (A).

The organohydrogenopolysiloxane as component (C) acts as a crosslinking agent for component (A). In order that the composition may form a network crosslinked structure on vulcanization, component (C) should have at least two Si-bound hydrogen atoms. Examples of organic groups bonded to silicon atoms in component (C) are the same as those enumerated for component (A). The organic groups may be of the same kind or of different kinds.

The siloxane unit of component (C) may be a linear structure, a network structure, a three-dimensional structure, or a combination of two or more thereof. The degree of polymerization of component (C) is preferably such that it has a viscosity of 0.5 to 50,000 cP, still preferably 1 to 10,000 cP, at 25° C.

Component (C) is used in an amount of from 0.1 to 10 parts by weight per 100 parts by weight of component (A).

The phenyl-containing diorganopolysiloxane as component (D) serves as a component which bleeds on the surface of the waterproof sealer of the present invention thereby reducing the force of fit between inner and outer housings and also providing satisfactory sealing properties. Component (D) has a viscosity of from 1 to 3,000 cSt, preferably from 10 to 1,000 cSt, at 25° C. If the viscosity is lower than 1 cSt, the silicone rubber composition would have reduced moldability. If it exceeds 3,000 cSt, the oil-bleeding properties would be insufficient for assuring satisfactory lubricity.

Examples of such a phenyl-containing diorganopolysiloxane include methylphenylpolysiloxane terminated with a trimethylsiloxy group at both terminals, a dimethylsiloxane-methylphenylsiloxane copolymer terminated with a trimethylsiloxy group at both terminals, a dimethylsiloxane-diphenylsiloxane copolymer terminated with a trimethylsiloxy group at both terminals, dimethylpolysiloxane terminated with a dimethylphenylsiloxy group at both terminals, and a dimethylsiloxane-methylphenylsiloxane copolymer terminated with a dimethylphenylsiloxy group at both terminals.

Component (D) is used in an amount of from 1 to 30 parts by weight, preferably from 5 to 20 parts by weight, per 100 parts by weight of component (A).

The catalyst for hydrosilylation as component (E) is the very component characterizing the present invention. Component (E) is a finely particulate catalyst comprising a non-silicone series thermoplastic resin containing 0.01 to 0.5% by weight, in terms of platinum atom, of a platinum catalyst.

Examples of the platinum catalyst includes fine platinum powder, chloroplatinic acid, alcohol-modified chloroplatinic acid, a complex of platinum and a diketone, a complex of chloroplatinic acid and an olefin, and a complex of chloroplatinic acid and an alkenylsiloxane, each of which may be supported on a carrier, such as alumina, silica or carbon black. Preferred of them is a complex of chloroplatinic acid and an alkenylsiloxane for its high catalytic activity. In particular, a complex of chloroplatinic acid and divinyltetramethylsiloxane as disclosed in JP-B-42-22924 (the term "JP-B" as used herein means "an examined published Japanese patent application") is still preferred.

The non-silicone series thermoplastic resin which constitutes the particulate catalyst should have a glass transition point falling within a range of from 50° to 200° C., preferably 70° to 150° C. If the glass transition point is lower than 50° C., the rubber composition has a seriously reduced storage stability. If it exceeds 200° C., the catalyst would demand too high a temperature for exhibiting its activity, practically failing to perform the function as a catalyst for hydrosilylation.

Examples of the non-silicone series thermoplastic resin includes polycarbonate resins, polymethyl methacrylate resins, and polystyrene resins, with polycarbonate resins being preferred.

Examples of the polycarbonate resins which can be used in the present invention preferably include those comprising a basic structure represented by formula (I):

wherein R represents a hydrocarbon group, and n represents a degree of polymerization, which may be determined depending on the properties of the resin, such as glass transition point. Still preferred are those in which R is an aromatic hydrocarbon group.

Typical examples of the aromatic polycarbonate resins include those obtained from 2,2-bis(4-hydroxyphenyl)propane, 2,2-bis(4-hydroxyphenyl)butane or 1,1-bis(4-hydroxyphenyl)isobutane.

The platinum catalyst is used in such an amount that the total catalyst has a platinum metal content of from 0.01 to 5% by weight, preferably from 0.1 to 5% by weight. In order that component (E) may manifest its full activity and retain dispersion stability when added to the silicone rubber composition, the average particle size of component (E) should fall within the range of from 0.1 to 20 μm. While not limiting, the particles preferably have a spherical shape.

The above-mentioned finely particulate catalyst for hydrosilylation is prepared by, for example, dispersing or dissolving a platinum catalyst and a non-silicone series thermoplastic resin in a low-boiling organic solvent, adding the resulting dispersion or solution dropwise to an aqueous solution of a surface active agent to prepare an oil-in-water emulsion, slowly removing the low-boiling solvent from the emulsion to form fine particles, and recovering the fine particles from the aqueous solution. Alternatively, a platinum catalyst and a non-silicone series thermoplastic resin are dispersed or dissolved in an organic solvent and atomizing the solution in a hot gas stream to evaporate the organic solvent to thereby solidifying the thermoplastic resin containing the platinum catalyst into fine particles in a suspended state. The latter method is preferred.

The thus prepared catalyst particles may be added as such to the composition. In some cases, it is recommended that the catalyst particles be added after being washed with a solvent which is incapable of dissolving the non-silicone series thermoplastic resin but capable of dissolving the catalyst for hydrosilylation to remove any platinum catalyst appearing on the surface of the particles.

Component (E) is used in a catalytic amount, preferably an amount of from 0.0000001 to 0.001 part by weight, more preferably from 0.000001 to 0.001 part by weight, in terms of platinum atom per 100 parts by weight of component (A). The term "catalytic amount" used herein means an amount of a catalyst in that the vulcanization reaction can practically proceed.

In addition to the essential components (A) to (E), the composition according to the present invention may further contain, if desired, a crepe hardening inhibitor, such as a silanol-terminated (both ends) diorganopolysiloxane, an organosilane, and an organodisilazane, and a compound known as a platinum catalyst inhibitor for controlling storage stability and curing characteristics, such as benzotriazole, acetylene compounds, and hydroperoxide compounds. The composition may furthermore contain various additives known for silicone rubber compounds, such as inorganic fillers, pigments, heat-resistant agents, and parting agents. Examples of suitable fillers or pigments include diatomaceous earth, powdered quartz, calcium carbonate, titanium oxide, carbon black, and red oxide. Examples of suitable heat-resistant agents include rare earth oxides, cerium silanolate, and cerium fatty acid salts. Examples of suitable parting agents include fatty acids and metal salts thereof, such as stearic acid, zinc stearate, and calcium stearate.

The waterproof sealer of the present invention can be produced by milling and kneading the above-described components, introducing the resulting rubber compound into a mold under pressure, and vulcanizing the compound by heating. The milling and kneading can be carried out by means of a conventional kneading machine for rubber compounds, such as a roll mill, a kneader, and a Banbury mixer. The vulcanization molding is performed by means of a conventional vulcanizing molding machine, such as an injection molding machine and a transfer molding machine.

The green (unvulcanized) rubber composition to be used in the production of the waterproof sealer for a connector according to the present invention exhibits excellent storage stability owing to the specific catalyst for hydrosilylation, whereas the vulcanizing time required is very short. Therefore, the efficiency of production of the waterproof sealer of the present invention is extremely high. Furthermore, since the composition contains a phenyl-containing diorganopolysiloxane oil having poor compatibility with the base rubber, this oil component gradually bleeds out after vulcanization, serving to assure the tight seal between housings and to minimize the resistance on fitting.

The present invention will now be illustrated in greater detail with reference to Reference Examples and Examples, but it should be understood that the present invention is not construed as being limited thereto. All the percents are given by weight unless otherwise specified.

REFERENCE EXAMPLE 1

Preparation of Vinylsiloxaneplatinum Complex

In 35 g of isopropyl alcohol were dissolved 6 g of a chloroplatinic acid aqueous solution having a Pt content of 33% and 16 g of 1,3-divinyltetramethyldisiloxane, and 10 g of sodium hydrogencarbonate was suspended in the solution. The suspension was heated at 70° to 80° C. for 30 minutes while stirring to carry out the reaction. After cooling, the solid matter was separated by filtration to obtain an isopropyl alcohol solution of a vinylsiloxaneplatinum complex having a Pt content of 4.2%.

REFERENCE EXAMPLE 2

Preparation of Pt Catalyst-Containing Polycarbonate Particles

In 8.5 kg of dichloromethane was dissolved 500 g of a polycarbonate resin obtained from 2,2-bis(4-hydroxyphenyl)propane ("Yupiron H-3000", produced by Mitsubishi Gas Chemical Co., Ltd.; glass transition point: 145°–150° C.), and 1.0 kg of toluene was added thereto. To the resulting solution was added 47.6 g of the vinylsiloxaneplatinum complex solution obtained in Reference Example 1 to prepare a uniform solution. The solution was continuously atomized into a spray drier chamber in which hot nitrogen gas was made to flow by using a two-fluid nozzle. The hot nitrogen gas stream had a temperature of 100° C. at the inlet of the chamber and 70° C. at the outlet and a flow rate of 1.3 m³/min. After operation for 5.5 hours, fine particles weighing 420 g were collected in a bag filter. The resulting catalyst particles (designated $CT_1$) had a spherical shape with some recesses on their surface, an average particle size of 1.5 μm, and a Pt content of 0.4%.

REFERENCE EXAMPLE 3

Preparation of Pt Catalyst-Containing Acrylic Resin Particles

Pt catalyst-containing acrylic resin particles (designated $CT_2$) were obtained in the same manner as in Reference Example 2, except for replacing the polycarbonate resin with an acrylic resin ("Acrypet VH", produced by Mitsubishi Rayon Co., Ltd.; glass transition point: 110°–120° C.). The resulting catalyst particles $CT_2$ had an average particle size of 1.4 μm and a Pt content of 0.4%.

REFERENCE EXAMPLE 4

Preparation of Pt Catalyst-Containing Silicone Resin Particles

Pt catalyst-containing silicone resin particles (designated $CT_3$) were obtained in the same manner as in Reference Example 2, except for replacing the polycarbonate resin with a silicone resin having a softening point of 145° C. (average formula: $(C_6H_5SiO_{3/2})_{0.9}(Me_2SiO)_{0.1}$; glass transition point: 90° C.). The resulting catalyst particles $CT_3$ had an average particle size of 1.2 μm and a Pt content of 0.4%.

EXAMPLES 1 TO 3 AND COMPARATIVE EXAMPLES 1 AND 2

The components shown in Table 1 below were kneaded by means of a kneader mixer and a twin roll to prepare a rubber composition.

TABLE 1

| Component | Rubber Composition (part by weight) | | | | |
|---|---|---|---|---|---|
| | Example 1 | Example 2 | Example 3 | Comparative Example 1 | Comparative Example 2 |
| SN[1] | 100 | 100 | 100 | 100 | 100 |
| MS[2] | 7 | 7 | 7 | 7 | 7 |
| SF$_1$[3] | 15 | 15 | 15 | 15 | 15 |
| SF$_2$[4] | 17 | 17 | 17 | 17 | 17 |
| SO$_1$[5] | 10 | 10 | — | 10 | 10 |
| SO$_2$[6] | — | — | 10 | — | — |
| SH[7] | 0.4 | 0.4 | 0.40 | 0.4 | 0.4 |
| CT$_1$ | 0.04 | — | 0.04 | — | — |
| CT$_2$ | — | 0.04 | — | — | — |
| CT$_3$ | — | — | — | — | 0.04 |
| PO[8] | — | — | — | 0.4 | — |
| IH[9] | 0.033 | 0.033 | 0.033 | — | 0.033 |

Note:
[1]: SN: Organopolysiloxane green rubber (dimethylsiloxane unit: 99.85 mol %; methylvinylsiloxane unit: 0.15 mol %; degree of polymerization: 5000)
[2]: MS: Dimethylsiloxane (silanol terminated (both ends) dimethylsiloxane; viscosity: 60 cSt)
[3]: SF$_1$: Silica fine particles prepared by a dry process (specific surface area: 200 m²/g)
[4]: SF$_2$: Silica fine particles prepared by a wet process (specific surface area: 130 m²/g)

TABLE 1-continued

Rubber Composition (part by weight)

| Component | Example 1 | Example 2 | Example 3 | Comparative Example 1 | Comparative Example 2 |
|---|---|---|---|---|---|

[5]: $SO_1$: Phenyl-containing diorganopolysiloxane (dimethylsiloxane-methylsiloxane-methylphenylsiloxane terpolymer represented by formula $Me_3SiO(Me_2SiO)_{16}(Ph_2SiO)_7SiMe_3$; wherein Me is methyl, and Ph is phenyl; viscosity: 350 cSt)

[6]: $SO_2$: Phenyl-containing diorganopolysiloxane (dimethylsiloxane-methylphenylsiloxane copolymer represented by formula $MePh_2SiO(Me_2SiO)_7SiMePh_2$; viscosity: 350 cSt)

[7]: SH: Organohydrogenopolysiloxane (di-methylsiloxane-methylhydrogenosiloxane copolymer represented by formula $Me_3SiO(Me_2SiO)_3(MeHSiO)_5SiMe_3$; viscosity: 25 cSt)

[8]: PO: Organic peroxide (2,5-dimethyl-2,5-di(t-butylperoxy)hexane)

[9]: IH: Platinum catalyst inhibitor (1-ethynyl-1-cyclohexanol)

Each rubber composition prepared was stored at 30° C. for 5 days or 30 days and then evaluated for the performance according to the following test methods. The results of the tests are shown in Table 2.

1) Time for Initiation of Vulcanization ($T_{10}$):

The rubber composition was heated at 170° C., and the time for initiation of vulcanization ($T_{10}$: time required for the torque to reach 10% of the final value) at that temperature was measured by using an oscillating disc rheometer, manufactured by Toyo Seiki Co., Ltd., to evaluate storage stability.

2) Moldability and Rejection Rate:

The rubber composition was molded in a transfer molding machine at a mold temperature of 170° C. while varying the vulcanizing time. The vulcanizing time at which a molded article having satisfactory physical properties could be obtained was measured to examine the effect of reducing a vulcanizing time. Then, rubber packing 1 shown in FIG. 1 was produced by transfer molding under vulcanizing conditions decided from the above experiments to examine the moldability of the composition and the rejection rate. These items of testing are also to evaluate the storage stability of the rubber composition. Moldability was rated as "good" (the composition could be molded by conventional operation) or "poor" (disorders, such as short shot, occurred considerably). The rejection rate is a proportion of products judged as "reject" due to poor moldability or poor appearance out of 400 molded articles (40-cavity×10 shots).

3) Force of Fitting:

Packing 1 obtained in (2) above and a rubber stopper 4 shown in FIG. 1 separately produced from the same rubber composition were fitted to inner housing 3 made of a synthetic resin. Inner housing 3 was fitted into outer housing 2 as shown in FIG. 1, and the force required for the fitting was measured with a compressive stress measuring device (autograph, manufactured by Shimadzu Corporation). In FIG. 1, the numeral 4 denotes a rubber stopper, 7 denotes a metallic terminal of inner housing 3, 8 denotes a metallic terminal of outer housing 2, and 9 denotes a wire.

Figure 2:
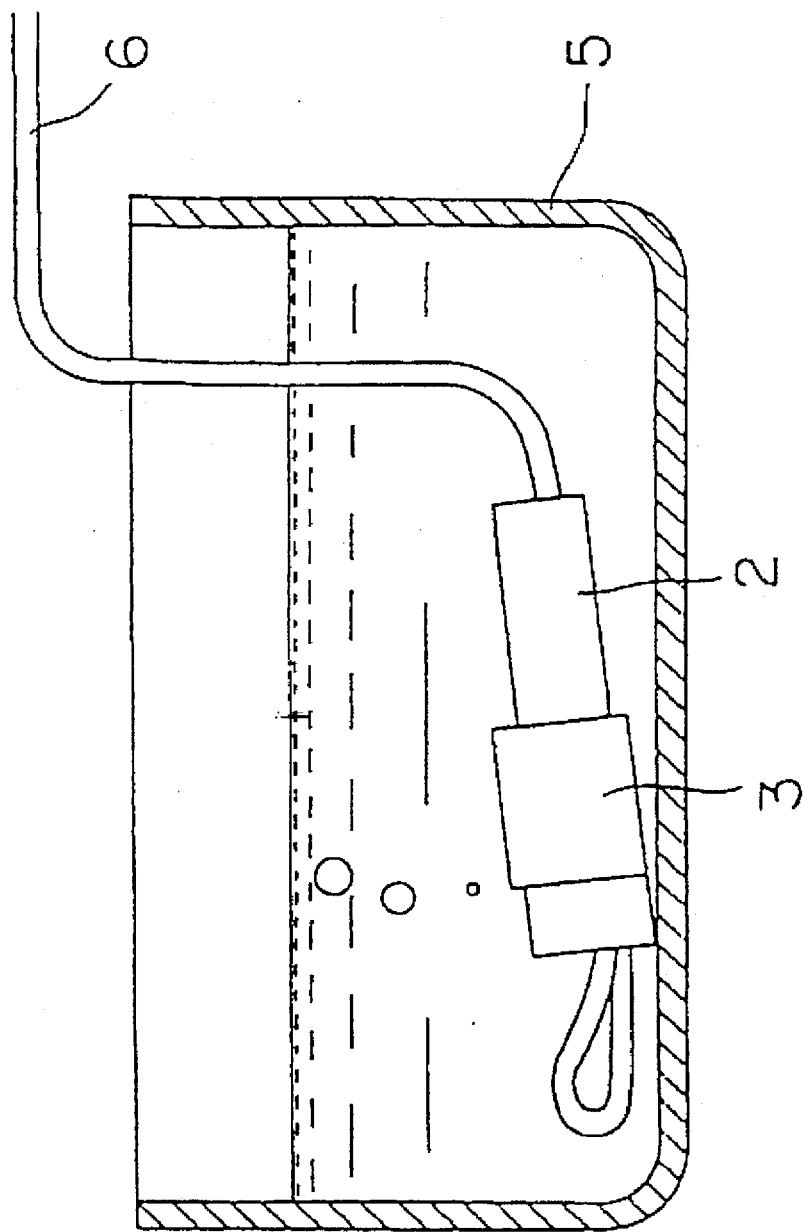
FIG. 2 is an illustration showing the method of testing waterproof sealing properties of a sealer for a connector.

4) Waterproofness:

Air tube 6 was inserted into a part of rubber stopper 4, and the connector was sunk under water in tank 5 having a depth of about 10 cm as shown in FIG. 2. Air of 9.8 kPa was fed through air tube 6 to the inside of the connector housing for 30 seconds to see if any air leakage occurred. Where no air leakage was observed, air was fed at a pressure increased by 9.8 kPa for an additional period of 30 seconds. In this way, "pass" or "fail" of waterproofness was judged by whether or not an air leakage took place until the air pressure reached 59 kPa. In order to examine heat resistant waterproofness of the sealer, the same test was conducted after the sealer was subjected to accelerated thermal deterioration at 120° C. for 1,000 hours.

TABLE 2

|  | Example 1 | Example 2 | Example 3 | Comparative Example 1 | Comparative Example 2 |
|---|---|---|---|---|---|
| After 5-Day Storage: | | | | | |
| $T_{10}$ (sec) | 41 | 38 | 42 | 56 | 8 |
| Moldability | good | good | good | good | poor |
| Rejection Rate (%) | 0.92 | 0.79 | 0.90 | 0.86 | 34.0 |
| Vulcanizing Time (min) | 2 | 2 | 2 | 7 | 2 |
| Force of Fitting (kgf) | 1.89 | 1.99 | 2.23 | 2.00 | 1.59 |
| Waterproofness | pass | pass | pass | pass | fail |
| Waterproofness (aged at 120° C. × 2,000 hrs) | pass | pass | pass | pass | fail |
| After 30-Day Storage: | | | | | |
| $T_{10}$ (sec) | 41 | 36 | 41 | 56 | unmeasurable |
| Moldability | good | good | good | good | unmoldable |
| Rejection Rate (%) | 0.88 | 0.86 | 0.78 | 0.76 | unmoldable |
| Vulcanizing Time (min) | 2 | 2 | 2 | 7 | unmoldable |
| Force of Fitting (kgf) | 1.92 | 1.79 | 2.19 | 1.88 | — |
| Waterproofness | pass | pass | pass | pass | — |
| Waterproofness (aged at 120° C. × 2,000 hrs) | pass | pass | pass | pass | — |

As described above, the waterproof sealer for a connector of the present invention can be produced from a green composition which has excellent storage stability, can be vulcanized in a reduced time, hardly produces defective moldings, and therefore has high productivity. The sealer of the present invention exhibits excellent waterproofness, surface lubricity and water repellency because of its smooth surface.

While the invention has been described in detail and with reference to specific examples thereof, it will be apparent to one skilled in the art that various changes and modifications can be made therein without departing from the spirit and scope thereof.

What is claimed is:

1. An oil-bleeding waterproof sealer for a connector comprising a vulcanized and molded article of a composition comprising:

(A) 100 parts by weight of a diorganopolysiloxane green rubber containing at least two alkenyl groups bonded to silicon atoms per molecule thereof, (B) from 10 to 100 parts by weight per 100 parts by weight of component (A) of a reinforcing filler, (C) from 0.1 to 10 parts by weight per 100 parts by weight of component (A) of an organohydrogenopolysiloxane having at least two hydrogen atoms bonded to silicon atoms per molecule thereof, (D) from 1 to 30 parts by weight per 100 parts by weight of component (A) of a phenyl-containing diorganopolysiloxane having a viscosity of 1 to 3,000 cSt at 25° C., and (E) a catalytic amount of a catalyst for hydrosilylation having a particle size of 0.01 to 20 μm which comprises a platinum catalyst and a polycarbonate resin obtained from 2,2-bis(4-hydroxyphenyl)propane and having a glass transition point of from 50° and 200° C., with the proportion of metallic platinum in said catalyst for hydrosilylation being 0.01 to 5% by weight.

2. An oil-bleeding waterproof sealer for a connector as claimed in claim 1, wherein said platinum catalyst of said catalyst for hydrosilylation (E) is a complex of chloroplatinic acid and an alkenylsiloxane.

3. An oil-bleeding waterproof sealer for a connector as claimed in claim 1, wherein the amount of said catalyst for hydrosilylation (E) is from 0.0000001 to 0.001 part by weight based on the amount of platinum atom per 100 parts by weight of said diorganopolysiloxane green rubber (A).

4. An oil-bleeding waterproof sealer for a connector as claimed in claim 3, wherein the amount of said catalyst for hydrosilylation (E) is from 0.000001 to 0.001 part by weight based on the amount of platinum atom per 100 parts by weight of said diorganopolysiloxane green rubber (A).

5. An oil-bleeding waterproof sealer for a connector as claimed in claim 1, wherein said alkenyl group of said diorganopolysiloxane green rubber (A) is selected from the group consisting of a vinyl group, an allyl group, and a hexenyl group.

6. An oil-bleeding waterproof sealer for a connector as claimed in claim 1, wherein said diorganopolysiloxane green rubber (A) has such a degree of polymerization that it has a viscosity of not lower than $10^7$ cSt at 25° C. and an average molecular weight of not less than $25 \times 10^4$.

7. An oil-bleeding waterproof sealer for a connector as claimed in claim 1, wherein said organohydrogenopolysiloxane (C) has such a degree of polymerization that it has a viscosity of 0.5 to 50,000 cP at 25° C.

8. An oil-bleeding waterproof sealer for a connector as claimed in claim 1, wherein said phenyl-containing diorganopolysiloxane (D) has a viscosity of from 10 to 1,000 cSt at 25° C.

\* \* \* \* \*